(12) United States Patent
Hambrecht

(10) Patent No.: US 12,736,030 B2
(45) Date of Patent: Sep. 15, 2026

(54) POWERTRAIN MOUNTING FOR PLANETARY TRANSMISSION

(71) Applicant: Flender GmbH, Bocholt (DE)

(72) Inventor: Ralf Hambrecht, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 19/139,760

(22) PCT Filed: Dec. 7, 2023

(86) PCT No.: PCT/EP2023/084685
§ 371 (c)(1),
(2) Date: Jun. 16, 2025

(87) PCT Pub. No.: WO2024/132556
PCT Pub. Date: Jun. 27, 2024

(65) Prior Publication Data

US 2026/0117746 A1 Apr. 30, 2026

(30) Foreign Application Priority Data

Dec. 20, 2022 (EP) .................................... 22214873

(51) Int. Cl.
*F03D 9/00* (2016.01)
*F03D 9/25* (2016.01)
*F03D 15/10* (2016.01)

(52) U.S. Cl.
CPC ............. *F03D 15/101* (2023.08); *F03D 9/25* (2016.05); *F05B 2260/40311* (2013.01)

(58) Field of Classification Search
CPC ......... F03D 15/101; F03D 9/25; B33Y 10/00; B33Y 50/02; B33Y 80/00; F05B 2230/31; F05B 2260/40311
See application file for complete search history.

(56) References Cited

U.S. PATENT DOCUMENTS

2010/0303626 A1 12/2010 Mostafi
2017/0175878 A1* 6/2017 Klein-Hitpass ......... F03D 15/10
2022/0010782 A1* 1/2022 Hoelzl ................ F16H 57/0424

FOREIGN PATENT DOCUMENTS

DE 102009052240 5/2011
DE 102010043946 7/2011
(Continued)

OTHER PUBLICATIONS

International Search Report issued on Feb. 13, 2024 by the European Patent Office in International Application PCT/EP2023/084685.

*Primary Examiner* — Julio C. Gonzalez
(74) *Attorney, Agent, or Firm* — Henry M. Feiereisen LLC

(57) ABSTRACT

A powertrain for a wind power installation includes a main bearing unit with a main shaft, and a planetary transmission driven by the main shaft and including a transmission housing and a planetary stage which revolves about a rotation axis in the transmission housing. The planetary stage includes a planet carrier, a ring gear, and a sun gear, with the planet carrier or the ring gear being drivingly connected, at least indirectly, to the rotor. The planet carrier includes planet gears which revolve conjointly with the planet carrier and alternately mesh with the ring gear and the sun gear. At least three guide elements disposed circumferentially about the rotation axis are each operatively connected alternately to the transmission housing and a circumferential region of the planet carrier. Each guide element is constructed of multiple parts and includes guide jaws disposed on axial sides of the planet carrier, respectively.

16 Claims, 7 Drawing Sheets

(56) References Cited

FOREIGN PATENT DOCUMENTS

| | | |
|---|---|---|
| EP | 2 975 299 | 1/2016 |
| WO | WO 2015/055188 | 4/2015 |
| WO | WO 2020/118328 | 6/2020 |

* cited by examiner

POWERTRAIN MOUNTING FOR PLANETARY TRANSMISSION

CROSS-REFERENCES TO RELATED APPLICATIONS

This application is the U.S. National Stage of International Application No. PCT/EP2023/084685, filed Dec. 7, 2023, which designated the United States and has been published as International Publication No. WO 2024/132556 A1 and which claims the priority of European Patent Application, Serial No. 22214873.6, filed Dec. 20, 2022, pursuant to 35 U.S.C. 119(a)-(d).

BACKGROUND OF THE INVENTION

The invention relates to a powertrain for a wind power installation driven by a rotor for the torque-transmitting connection of a rotor to a generator, comprising a main bearing unit having a bearing housing and a main shaft, and a planetary transmission which is driven by the main shaft and has at least one planetary stage which revolves about an axis of rotation $A_D$ in a transmission housing, wherein the at least one planetary stage has a planet carrier and a ring gear, and the planet carrier or the ring gear for driving is operatively connected at least indirectly to the rotor, and wherein the planet carrier has a plurality of planet gears which revolve conjointly with the planet carrier and alternately mesh with the ring gear and a sun gear.

Planet carriers in planetary transmissions for wind power or industrial applications are usually mounted in a transmission housing by rolling bearings. The mounting is usually carried out with cylindrical roller bearings, torque bearings or tapered roller bearings. These have in each case an inner and an outer ring. In particular, outer rings are subject to an increased risk of ring migration, and are secured against rotation in a form-fitting manner, for example. In more recent integrated powertrain concepts, the drive shaft mounting partly assumes the function guiding the first planet carrier. The mounting of the planet carrier in the transmission housing is then disposed in the region in which the planet carrier is connected to the drive shaft, or in the region in which the planet carrier is connected to an output shaft on the output side. A common feature of both design embodiments is that the planet carrier is mounted in the region of a smaller diameter in comparison to the external diameter of the planet carrier external diameter. Consequently, the support structure of the transmission housing, for example webs or flanges, has to be pulled inward onto the small diameter of the bearing in order to absorb the bearing forces. As a result, more material has to be used and more axial installation space is required for the mounting of the planet carrier in the transmission housing.

The rolling bearings used generally have a high stiffness and, during operation, position the planet carrier in an actual position which does not necessarily correspond to the target position which would arise from the equilibrium of the toothing forces, for example at nominal load. As a result of the deviation of the actual position from the target position, additional constraining forces arise on the bearings and in the planetary stage. The rolling bearings used are large in terms of construction and have a decisive influence on the overall costs of the transmission. In the case of high outputs or drive torques, the shaft-to-hub connections between the drive shaft and the planet carrier would have to be selected to have larger connection diameters, which in turn requires larger bearing diameters for the mounting of the planet carrier. EP 2 975 299 A1 shows a planetary transmission in which the planet carrier is supported in the transmission housing by segmented radial plain bearings. There is a constant need to refine the mounting of the planet carrier in such a way that higher outputs or drive torques can be transmitted.

It is the object of the invention to demonstrate measures which enable improved mounting of the planet carrier at high outputs or drive torques.

SUMMARY OF THE INVENTION

The object is achieved by a planetary transmission as set forth hereinafter. Preferred refinements are specified in the dependent claims and the description below and can each represent an aspect of the invention individually or in combination. If a feature is presented in combination with another feature, this serves only for simplified presentation of the invention and is in no way intended to mean that this feature cannot also be a development of the invention without the other feature.

One embodiment relates to a powertrain for a wind power installation driven by a rotor for the torque-transmitting connection of a rotor to a generator, comprising a main bearing unit having a bearing housing and a main shaft, and a planetary transmission which is driven by the main shaft and has at least one planetary stage which revolves about an axis of rotation $A_D$ in a transmission housing, wherein the at least one planetary stage has a planet carrier and a ring gear, and the planet carrier or the ring gear for driving is operatively connected at least indirectly to the rotor, and wherein the planet carrier has a plurality of planet gears which revolve conjointly with the planet carrier and alternately mesh with the ring gear and a sun gear, and wherein provided are a plurality of guide elements which are disposed circumferentially about the rotations axis $A_D$ and are in each case operatively connected alternately to the transmission housing and to a circumferential region of the planet carrier.

The planetary transmission can comprise one or more planetary stages. The respective last planetary stage can drive a generator indirectly or directly. In the case of an indirect drive, an interposed spur gear stage can be provided. The planet carrier can be of basket-like design, wherein the planet carrier by way of a suitable rolling bearing assembly is mounted so as to be rotatable about the rotation axis $A_D$ relative to a housing, or a housing part, respectively. In the present case, the rotation axis $A_D$ defines the axial direction, so that the respective radial directions are derived from this axial direction.

The planet gears are held on the planet carrier by planet axles. The planet axles run parallel to and so as to be offset from the axis of rotation $A_D$. The planet gears are each enclosed on both axial sides by a lateral support of the planet carrier. The planet carriers are set apart from the planet carrier or the lateral supports in a radial direction inward and a radial direction outward and mesh with a ring gear and a sun gear or a sun gear shaft, respectively.

The guide elements can either be circumferentially uniformly spaced apart or be circumferentially disposed in such a way that individual guide elements have a different circumferential spacing from the one adjacent guide element than from the respective other adjacent guide element. The guide elements can either be held in a rotationally fixed manner on the transmission housing, or be held on the planet carrier so as to revolve conjointly with the latter. When the guide elements are fastened to the transmission housing, a relative movement between the guide elements, on the one hand, and the planet carrier, on the other hand, arises during operation. When the guide elements are fastened to the planet carrier, a relative movement between the guide elements, on the one hand, and the transmission housing, on the other hand, arises during operation.

Depending on the design, the guide elements can be operatively connected to the planet carrier or to the transmission housing by sliding friction or by rolling friction. The plurality of guide elements can be embodied differently from one another. By way of example, provision may be made whereby, in principle, two types of guide elements that act differently in terms of their function are used. An operative connection is to be understood as meaning any kind of action of the guide elements on the planet carrier or the transmission housing, depending on where the guide elements are fastened. Expediently, this action consists in radially or axially guiding the planet carrier within the transmission housing.

In the case of the first functional type of the guide elements, provision is made for said guide elements to act in each case substantially in a radial direction on the planet carrier. This first functional type of the guide elements largely compensates for the weight force of the planet carrier and the planet gears seated therein, and the sun gear. In this case, however, it is not absolutely necessary for the guide elements to hold the planet carrier in an exactly defined position; instead it can be considered to be sufficient if the position of the planet carrier is within a defined bandwidth.

In the case of the second functional type of the guide elements, provision is made for said guide elements to be adjustable herein and in each case to specify movement limits within which the planet carrier, specifically preferably after the weight force of the planet carrier with the planet gears and the sun gear has been compensated for by the first functional type of the guide elements.

Self-centering of the toothed elements, i.e. planet gears and sun gear, in the planetary stage is permitted in a targeted manner and supported in a weight-relieving manner by the guide elements. Thus, no constraining forces arise from the overdetermination during operation under load, which forces are created in the rolling bearings used to date. As a result, it is also possible to completely eliminate the risk of analytically incompletely predictable ring migration, such that premature repair or even complete failure of the planetary stage or of the entire transmission can be avoided. The variable weight relief of the planet carrier is achieved by means of the guide elements in order to reduce tilting and to produce an improved supporting behavior in the toothing. This advantage can be used in particular when a flexible coupling is used in the main shaft in association with at the same time a rigid connection between the main bearing unit and the transmission housing, and thus saves a fully configured planet carrier mounting in the first planetary stage.

In a preferred embodiment of the planetary transmission, the circumferential region interacting with the guide elements is disposed in an outer third of a radius of the planet carrier. This ensures that sufficiently large guiding and/or supporting forces can be applied by way of the guide elements as a result of the lever action.

In a preferred embodiment of the planetary transmission, at least three guide elements distributed over the circumference are provided. In this case, provision may be made, in particular, for the guide elements to be designed in accordance with the described second functional type. Here, in a specific design embodiment, provision may be made for two of the guide elements to be disposed in a region of the lower half of the circumference of the planet carrier.

In a preferred embodiment of the planetary transmission, the guide elements guide the planet carrier in the axial and in the radial direction relative to the transmission housing. Here, in a specific configuration, provision may be made for at least one of the guide elements to encompass the planet carrier in the radial direction on one axial side, preferably on both axial sides.

In a preferred configuration of the planetary transmission, the guide elements are each constructed of multiple parts, wherein one guide jaw is in each case disposed on each axial side of the planet carrier. In particular, it can advantageously be provided that the guide jaws are constructed of multiple parts, preferably of two parts, wherein for respective guiding a first jaw part impinges on an outer circumferential face of the planet carrier and a second jaw part impinges on an axial lateral face of the planet carrier. In one possible variant, the first jaw part can comprise a rotatably mounted guide roller.

In a further and preferred embodiment, the first jaw part forms at least one substantially radially extending oil channel. An oil channel can be implemented by bores or grooves which are incorporated into the first jaw part, in the respective guide element, the planet carrier and/or the support structure of the transmission housing. Lubricant can be directed from the stationary support structure to the rotating parts of the planet carrier by way of the at least one oil channel. The lubricant serves to lubricate and control the temperature of the tribological contact points of the guide elements per se, but also to lubricate the planetary stage and the adjacent components.

In a preferred embodiment of the planetary transmission, at least one of the guide elements sits so as to be preloaded in the radial direction between the transmission housing and the planet carrier. In the case of the second functional type of the guide elements, an additional, adjustable element can advantageously be provided, wherein the additional element is preferably disposed on a stationary support structure. The additional element is equipped with a force/displacement and acceleration sensor system and is impinged on by a defined force acting on the mating face which rotates during operation and is lubricated with transmission oil. The mating face is expediently a circumferential face of the planet carrier. In addition to the known contact pressure force, the frictional force occurring perpendicular to the contact pressure force is also detected, for example in the form of a measurement of the bending stress of the guide element. An assessment of the lubricant state and of the general lubricating and wear state of the mechanical components can be made by the evaluation of the force/displacement sensor system in combination with a differential rotational speed measurement between the support structure and the planet carrier. The acceleration sensor system should in particular also cover the range of so-called acoustic emission in the frequency range between 20 kHz and 1 MHz, in order also to be able to detect friction-induced vibration excitations and thus first, potentially wear-generating, contacts of the roughness peaks. With this additional function in a guide element, the age-dependent lubricant state can be determined, and a prediction of the lubricant change interval or of the remaining service life can be determined.

In preferred alternative embodiments, provision is made for either the connection between the bearing housing of the main bearing unit and the transmission housing to be flexibly embodied, or for the connection between the main shaft of the main bearing unit and the planet carrier of the planetary stage to be flexibly embodied.

The object is likewise achieved by a wind power installation having a rotor flange with a multi-blade rotor and a generator, wherein provided is a powertrain which is held rotatably on a support and connects the rotor flange to the generator, and the powertrain is designed as described above.

The object is further achieved by a data agglomerate comprising data packets combined in a common file or distributed among different files for depicting the three-dimensional design and/or the interactions of all the constituent parts provided in a planetary transmission as described above, wherein the data packets are specified, during processing by a data processing device, to carry out additive manufacturing of the constituent parts of the planetary transmission, in particular by 3D printing by means of a 3D printer, and/or simulation of the functioning of the planetary transmission. This enables cost-effective production of prototypes and/or computer-based simulations to study the functioning of the planetary transmission, to identify problems in the specific application and to find improvements.

BRIEF DESCRIPTION OF THE DRAWING

Below, the invention will be explained by way of example with reference to the appended drawings on the basis of preferred exemplary embodiments, wherein the features presented below may in each case individually or in combination represent an aspect of the invention. It is shown in.

DETAILED DESCRIPTION OF PREFERRED EMBODIMENTS

Figure 1:
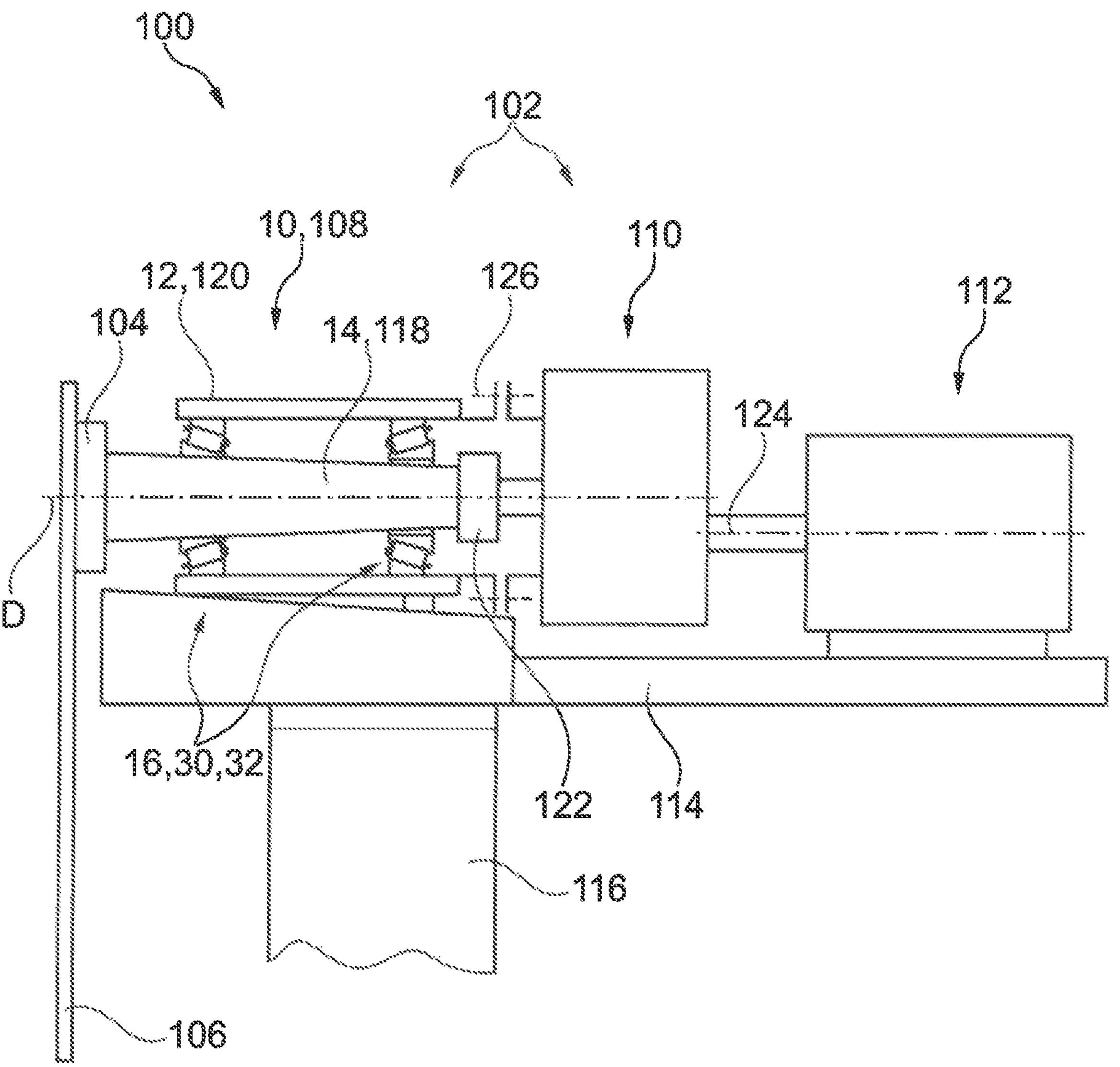
FIG. 1: a schematic illustration of a wind power installation in one possible embodiment.

FIG. 1 shows, in a schematic illustration which is not true to scale, a wind power installation 100 in one possible embodiment. A substantial element of the wind power installation 100 is a powertrain 102, which in the present case structurally comprises a rotor flange 104 with a rotor 106, a main bearing unit 108, a transmission 110 and a generator 112. By way of a machine support 114, at least the main bearing unit 108 and the generator 112 are supported relative to the ground, which is not illustrated, by way of a tower 116.

The main bearing unit 108 comprises a main shaft 118 which is mounted by a rolling bearing assembly 16 so as to be rotatable about an axis of rotation D relative to a bearing housing 120 of the main bearing unit 108. The rotor flange 104 is held at one end of the main shaft 118 and the rotor 106 is held on the former. The other end of the main shaft 118 for driving is operatively connected to the transmission 110 by a coupling element 122 in order to introduce a drive torque applied by the rotor 106 into the transmission 110. The connection by the coupling element 122 is flexible or flexural The transmission 110 can be embodied as a planetary transmission with one or more planetary stages. The transmission 110 for driving is operatively connected to the generator 112 by a generator shaft 124. The bearing housing 120 is connected substantially rigidly to the transmission 110 by a flange element 126, A reaction torque of the transmission 110 is supported by the flange element 126 relative to the rotor bearing housing and moreover relative to the machine support 114.

In the embodiment of the wind power installation 100 shown in FIG. 1, the transmission housing 12 is linked substantially rigidly to the bearing housing 120 by way of the flange 126. In contrast, the transmission input shaft, for example a planet carrier, is flexibly linked to the main shaft 118 by way of the coupling element 122. In an alternative embodiment of the wind power installation 100, which is however not shown, the transmission housing 12 is linked flexibly or flexurally to the bearing housing 120, and the transmission input shaft, here also for example a planet carrier, is linked substantially rigidly to the main shaft 118.

Figure 2:
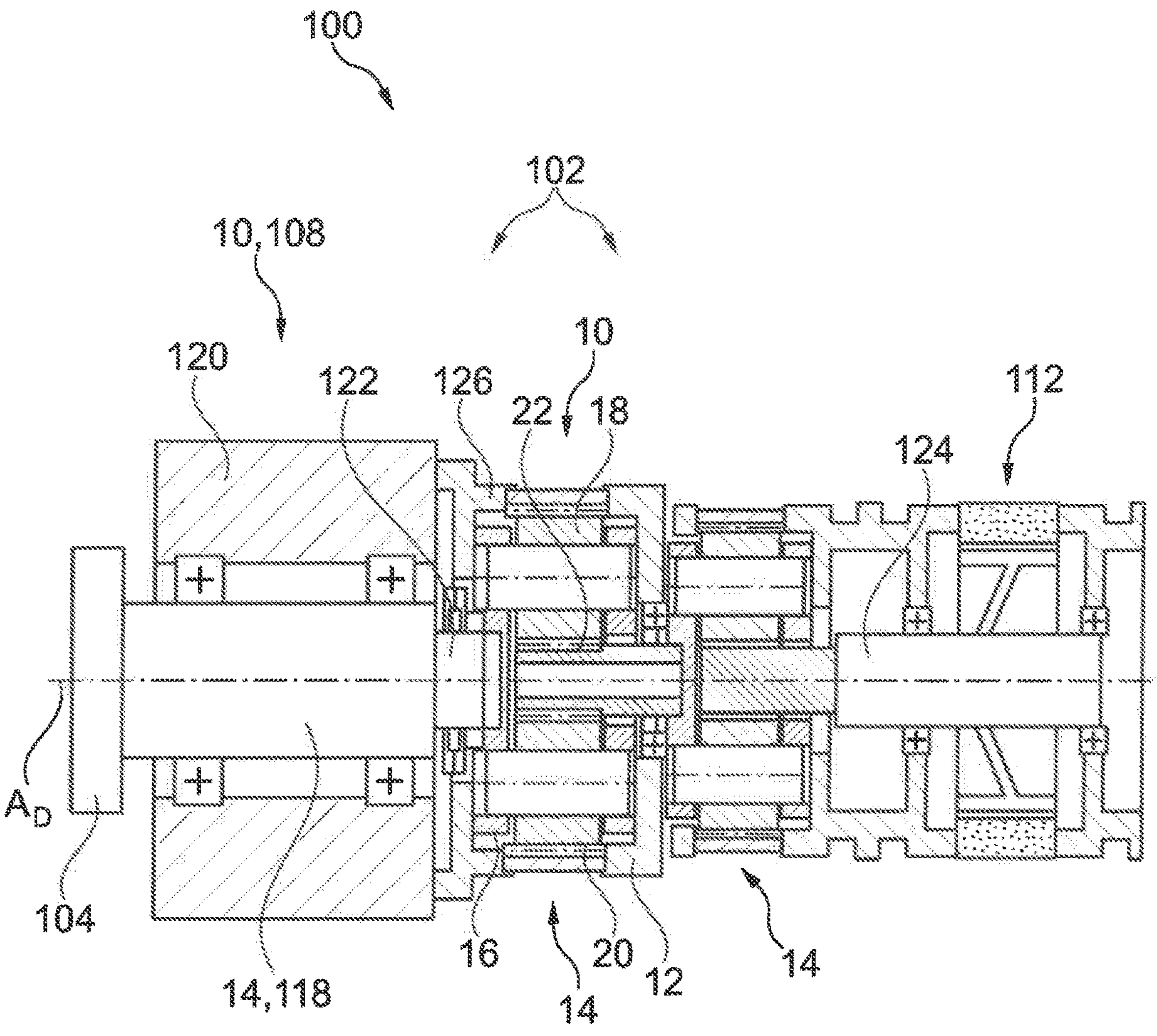
FIG. 2: a cross section through the transmission with two planetary stages.

FIG. 2 shows a cross section through the transmission 110, which in the present case is embodied with two planetary stages 14. The rigid link between the transmission housing 12 and the bearing housing 120 is shown here merely by way of example. The planetary transmission 10 comprises the transmission housing 12, in which two planetary stages 14 revolve about an axis of rotation $A_D$. Each planetary stage 14 has a planet carrier 16 and a ring gear 20. The planet carrier 16 for driving is operatively connected indirectly to the rotor 106, wherein the planet carrier 16 has a plurality of planet gears 18 which revolve conjointly with the planet carrier 16 and which alternately mesh with the ring gear 20 and a sun gear 22. The sun gear 22 of the first planetary stages is in turn for driving operatively connected to a planet carrier 16 of the second planetary stage, which in the present case does not require any further description.

Figure 3:
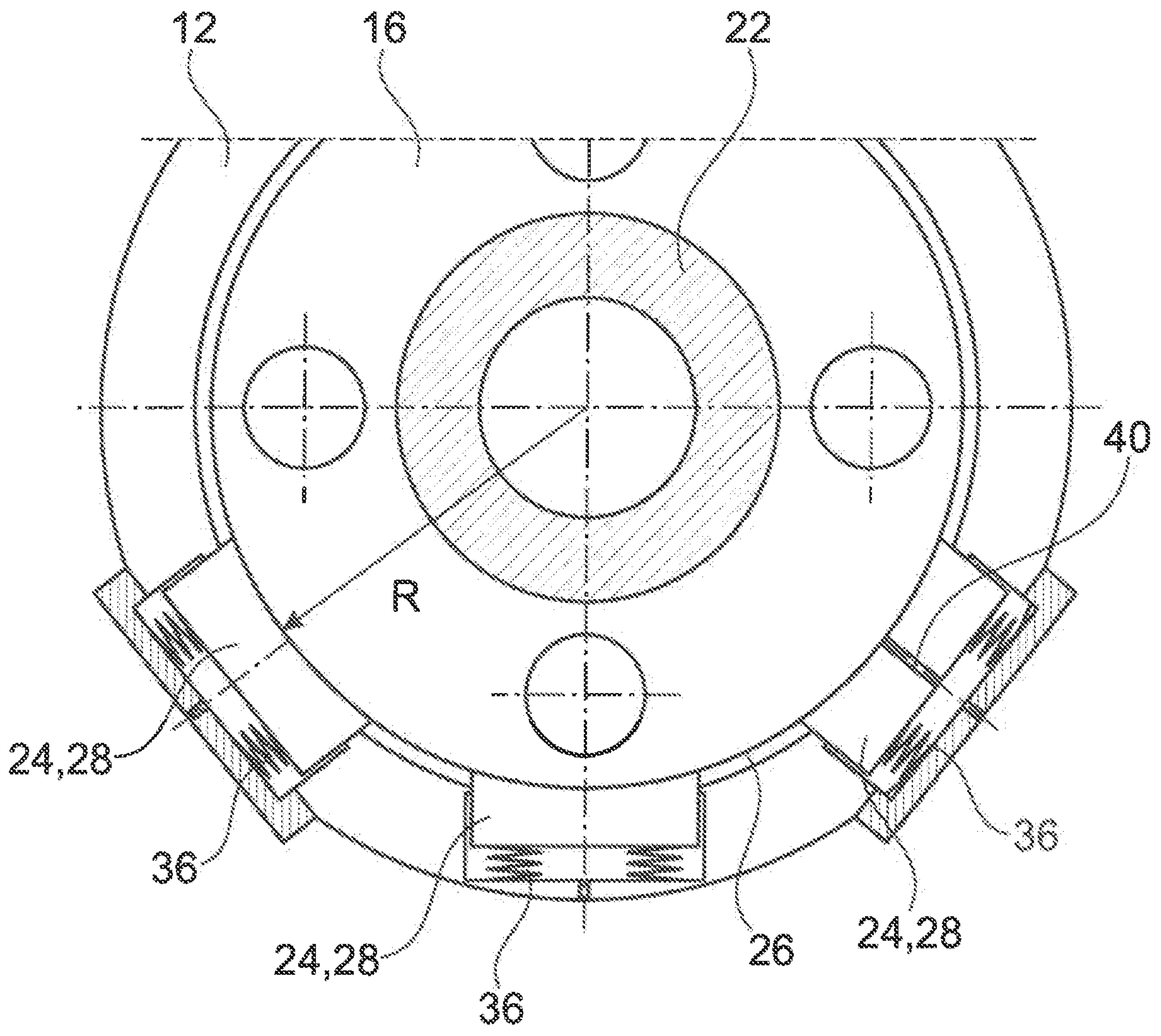
FIG. 3: an axial view of the first planetary stage with guide elements.
Figure 4:
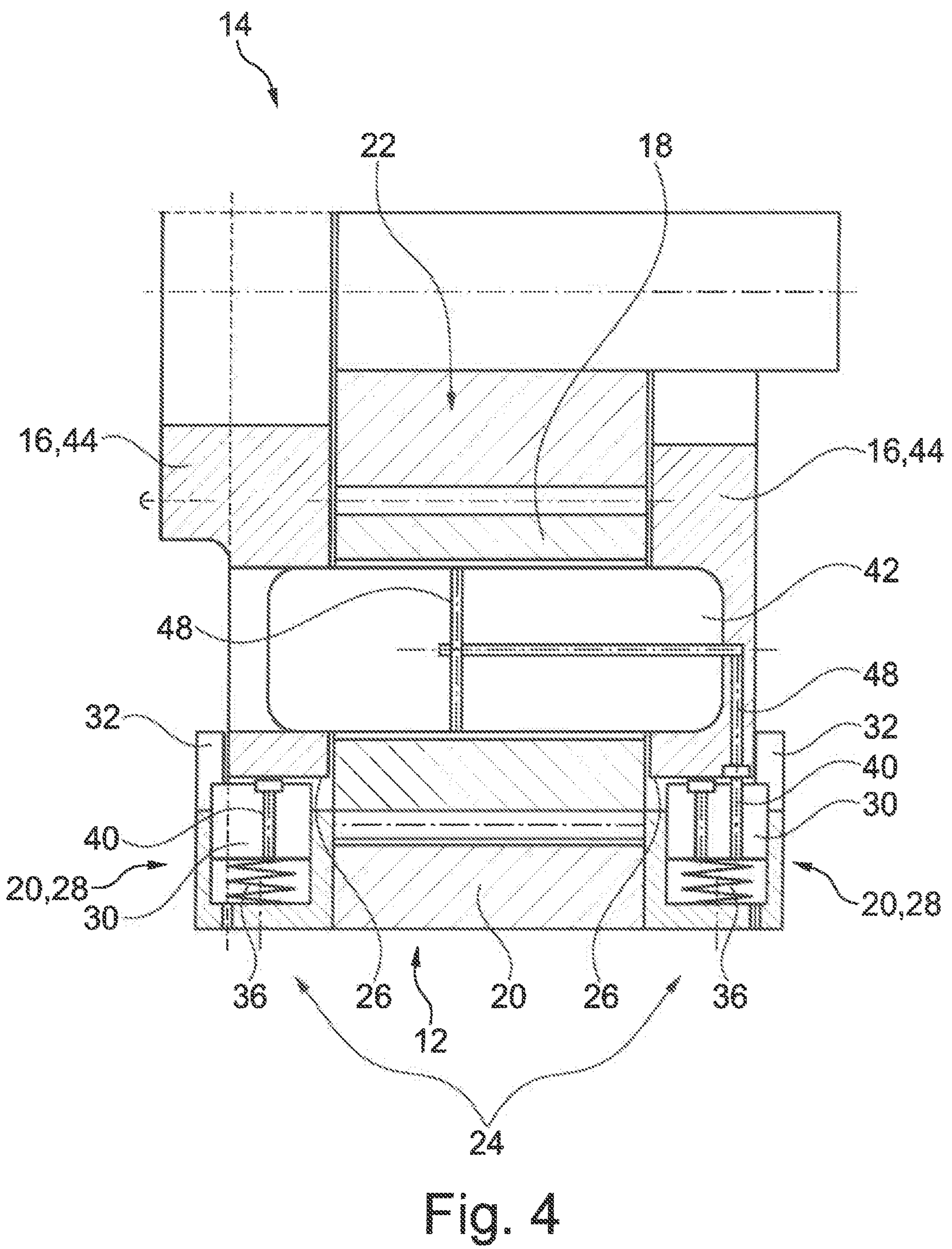
FIG. 4: a detail of a guide element.

Guide elements 24 are described by means of FIGS. 3 and 4, wherein provided are a plurality of guide elements 24 which are disposed circumferentially relative to the rotation axis $A_D$ and which are in each case operatively connected alternately to the transmission housing 12 and to a circumferential region of the planet carrier 16.

FIG. 3 shows an axial view of the first planetary stage 14, of which the planet carrier 16 and the surrounding transmission housing 12 are shown Moreover, a first functional type of the guide elements 24 is shown, wherein in the present case three of these guide elements 24 are disposed in a region of the lower half of the circumference of the planet carrier 16. In the present case, the guide elements 24 are held in a rotationally fixed manner on the transmission housing 12. Moreover, the guide elements 24 are disposed in a circumferential region 26 of the planet carrier 24 situated in an outer third of a radius R of the planet carrier 16. The guide elements 24 sit so as to be preloaded in the radial direction between the transmission housing 12 and the planet carrier 16. Spring elements 36 can be provided for effecting the radial preload of the guide elements 24. The guide elements 24 rest in a sliding manner on a circumferential face 38 of the planet carrier 16. In one of the guide elements, an oil channel 40 is provided, as will be explained below with reference to the figures hereunder. The guide elements 24 of the first functional type compensate at least largely for the weight force of the planet carrier 16 and the planet gears 18 and sun gear 22 seated therein.

FIG. 4 shows a detail of the first planetary stage 14 in the region of one of the guide elements 14. Shown is a cross section through a planet gear 18 which sits so as to be rotatable on a planet axle 42 between lateral supports 44 of the planet carrier 16. The guide elements 24 guide the planet carrier 16 relative to the transmission housing 12 in the axial and in the radial direction. The guide elements 24 are in each case constructed of multiple parts, wherein in each case one guide jaw 28 is disposed on each axial side of the planet carrier 16. It can be seen that the guide element 24 encompasses the planet carrier 16 on its two axial sides in the radial direction. In the present case, the guide jaws 28 are constructed of two parts, wherein for respective guiding a first jaw part 30 impinges on an outer circumferential face 28 of the planet carrier 16 and a second jaw part 32 impinges on an axial lateral face of the planet carrier 16. An oil channel 40 extends in each of the first jaw parts 30, which oil channel can extend radially, opening out in the region of the contact pairing of the outer circumferential face 28 of the planet carrier 16 and the inner face of the first jaw part 30 in order to supply this contact pairing with lubricant.

As can be seen here, provision can be made for a second oil channel 48 to extend in one of the two first jaw parts 30. In addition, a further oil channel 50, which communicates with the second oil channel 48 and which opens out at an outer circumference of the planet axle 42 and as a result supplies the mounting of the planet gear 18 on the planet axle 42 with lubricant, extends in the planet carrier 16 and in the planet axle 42.

Figure 5:
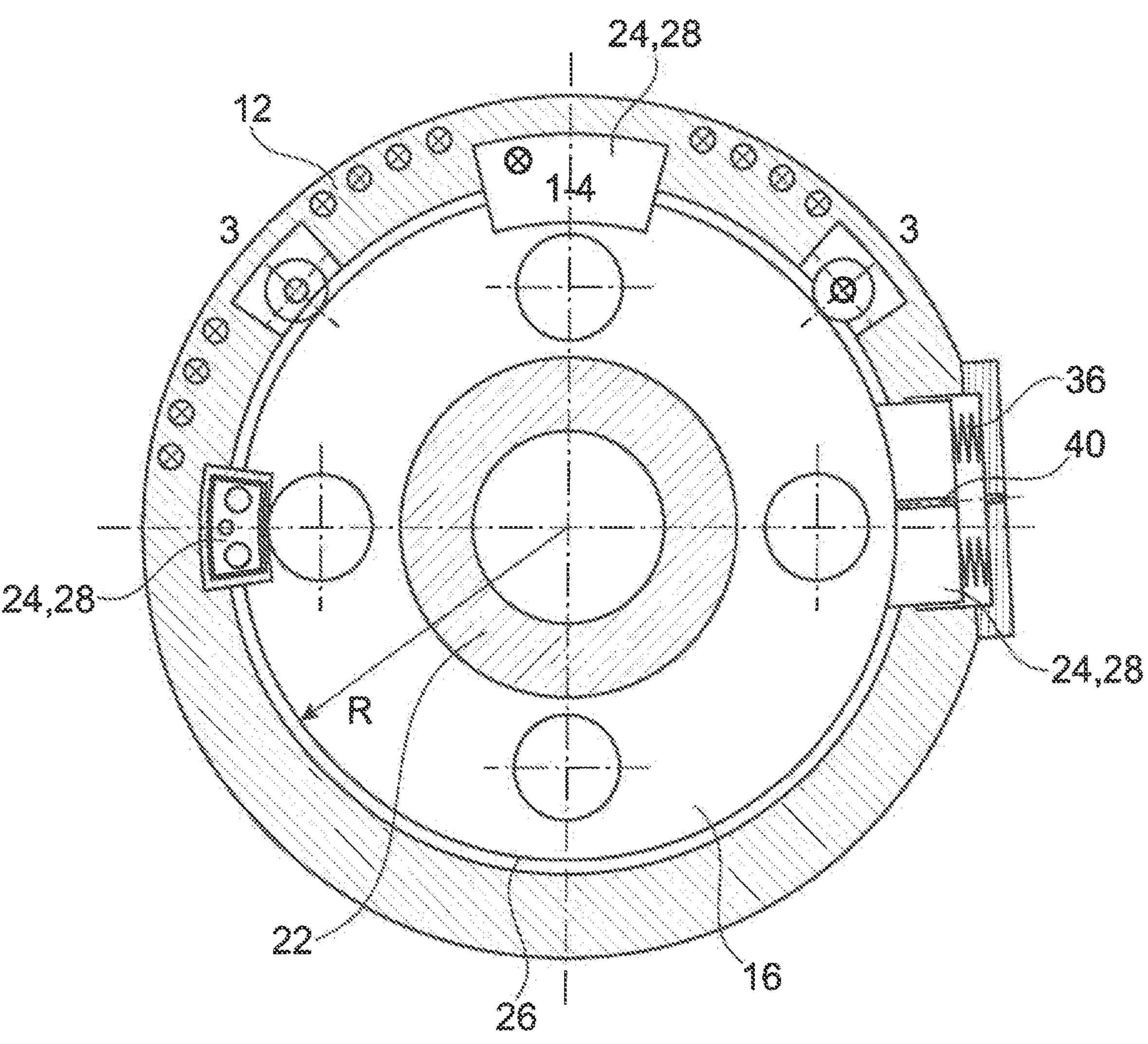
FIG. 5: an axial view of the first planetary stage with guide elements in further embodiments, and FIGS. 6, 7*a*), 7*b*): show further details of the planetary stage in the region of the guide elements.

FIG. 5 likewise shows an axial view of the first planetary stage 14 of which the planet carrier 16 and the surrounding transmission housing 12 are shown. Moreover, the second functional type of the guide elements 24 is shown, wherein in the present case three of these guide elements 24 are disposed in a region of the upper half of the circumference of the planet carrier 16. The design embodiment of the guide element 24 shown on the right corresponds to the guide elements 24 which have been described in relation to FIG. 4, except for the positioning. The design embodiment of the guide elements 24, which are illustrated at the top and the left in FIG. 5, is an alternative and will be described in detail on the basis of FIGS. 6, 7*a*) and 7*b*). In the second functional type, too, the guide elements 24 are held in a rotationally fixed manner on the transmission housing 12 and are disposed in a circumferential region 26 of the planet carrier 24, which is situated in an outer third of a radius R of the planet carrier 16. The guide elements 24 rest in a sliding manner on a circumferential face 38 of the planet carrier 16. The second functional type of the guide elements 24 allows the self-centering of the toothed elements, that is to say of the planet gears 18 and of the sun gear 22, within the planetary stage 14 in a targeted manner. Adjustable movement limits in the radial direction are predefined for the planet carrier 16 by way of the guide elements 24.

Figure 6:
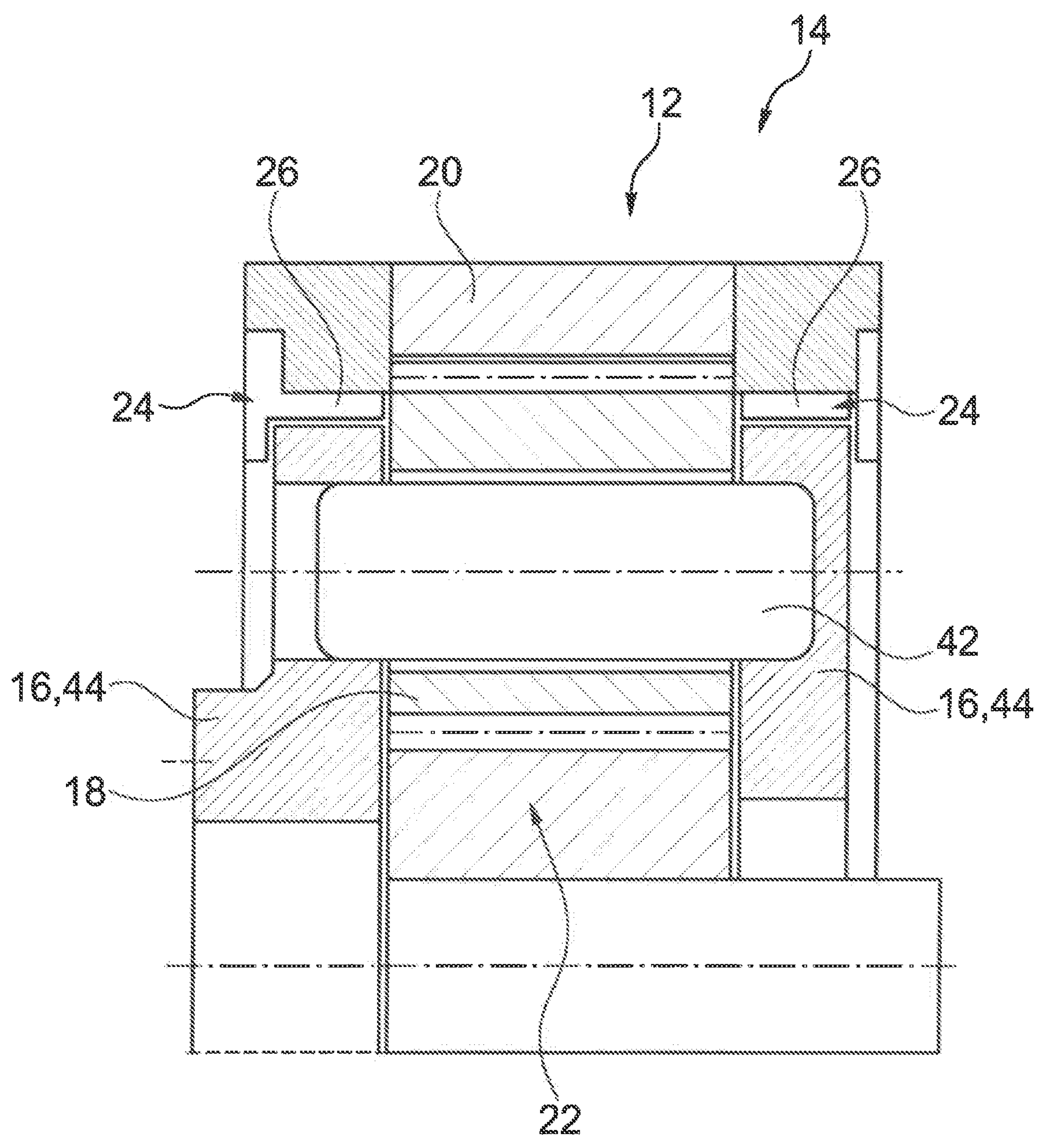
Figure 7:
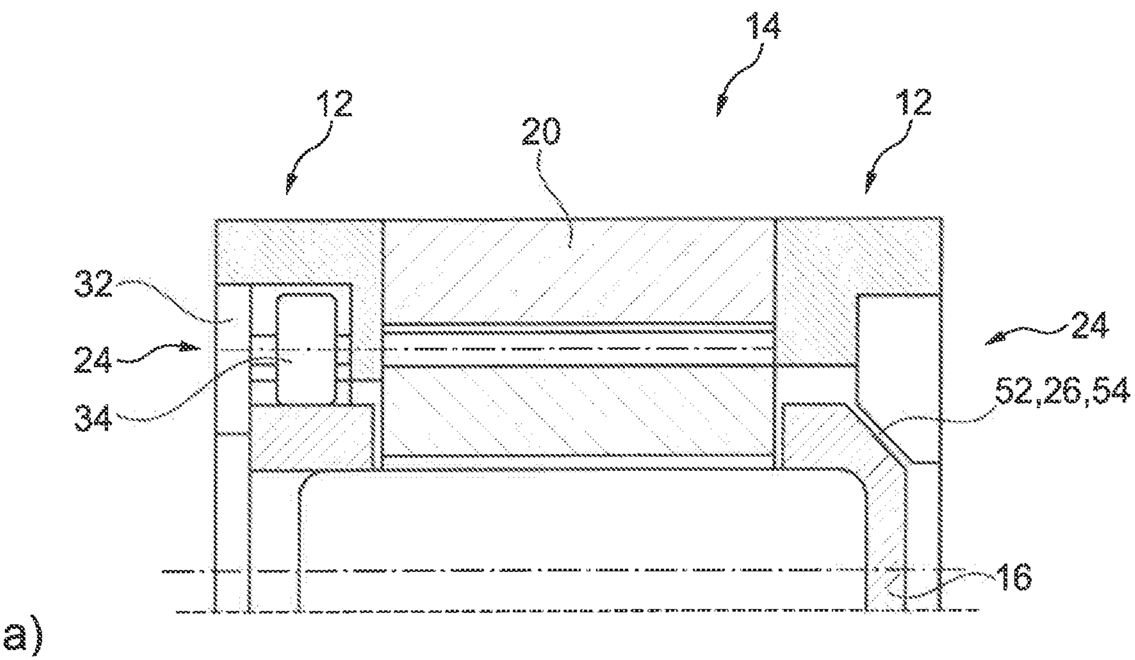
Figure 7:
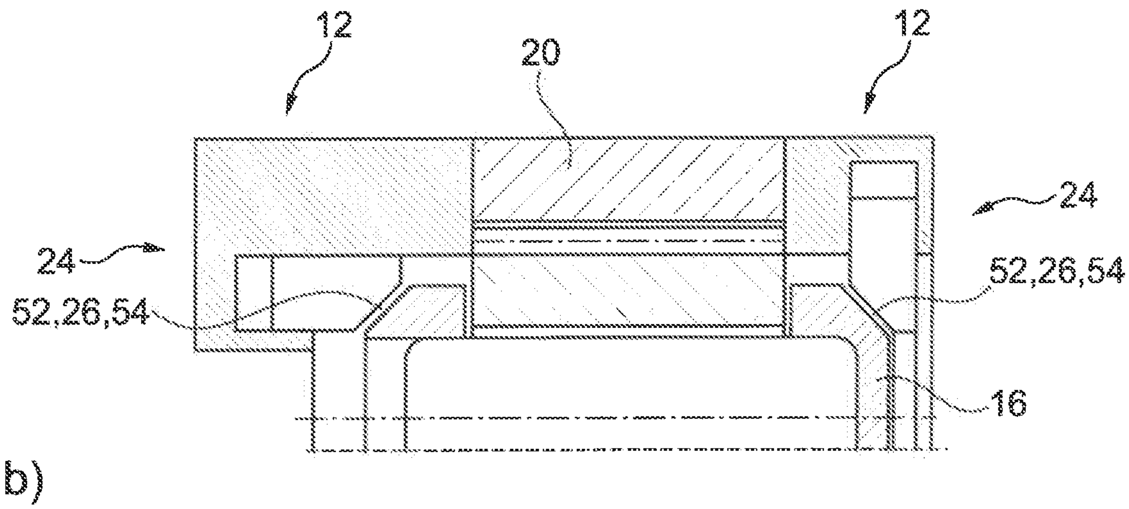

FIGS. 6, 7*a*) and 7*b*) show respective details of the first planetary stage 14 in the region of the guide elements 24. The guide elements are shown in various alternative design embodiments. FIG. 6 once again shows the first planetary stage 14 in the region of one of the guide elements 14. Shown is a cross section through a planet gear 18 which sits so as to be rotatable on a planet axle 42 between lateral supports 44 of the planet carrier 16. Two alternative design embodiments of the guide element 24 are illustrated. While the guide element 24 illustrated on the left between the transmission housing 12 and the planet carrier 16 is embodied in one part, the guide element 24 illustrated on the right between the transmission housing 12 and the planet carrier 16 is embodied in two parts. Both alternative design embodiments of the guide element 24 are screwed in a suitable manner to the transmission housing 12, which is embodied as a support structure of the ring gear 20 in this region, and guide the planet carrier both in the radial and in the axial direction.

FIG. 7*a*) shows, on the left, a design embodiment of the guide element 24 that is again embodied in two parts and comprises a guide roller 34 for radially guiding the planet carrier 16. As in the case of the alternatives of FIGS. 4 and 6, axial guiding of the planet carrier 16 is assumed by a second jaw part 32. The alternatives of the guide element 24 shown in FIG. 7*a*) on the left and 7*b*) are of structurally comparable design in that they are specifically provided with a wedge-shaped bevel 52 and interact with a mating face 54 of complementary design of the planet carrier 16. Axial and, at the same time, radial guiding of the planet carrier 16 relative to the transmission housing 12 is Implemented by way of the pairing of the bevel 52 and the mating face 54.

The invention claimed is:

1. A powertrain for a wind power installation driven by a rotor for torque-transmitting connection of the rotor to a generator, the power train comprising:

a main bearing unit comprising a bearing housing and a main shaft;

a planetary transmission driven by the main shaft, said planetary transmission comprising a transmission housing and at least one planetary stage which revolves about a rotation axis in the transmission housing, said at least one planetary stage comprising a planet carrier, a ring gear, and a sun gear, with the planet carrier or the ring gear being operatively connected, at least indirectly, to the rotor, said planet carrier comprising a plurality of planet gears which revolve conjointly with the planet carrier and alternately mesh with the ring gear and the sun gear; and at least three guide elements disposed circumferentially about the rotation axis and each operatively connected alternately to the transmission housing and a circumferential region of the planet carrier, each of said guide elements constructed of multiple parts and comprising guide jaws disposed on axial sides of the planet carrier, respectively.

2. The powertrain of claim 1, wherein the circumferential region of the planet carrier interacting with the guide elements is disposed in an outer third of a radius of the planet carrier.

3. The powertrain of claim 1, wherein two of the guide elements are disposed in a region of a lower half of a circumference of the planet carrier.

4. The powertrain of claim 1, wherein the guide elements are designed to guide the planet carrier in axial and radial directions relative to the transmission housing.

5. The powertrain of claim 3, wherein at least one of the guide elements is designed to encompass the planet carrier in a radial direction on one of the axial sides of the planet carrier.

6. The powertrain of claim 1, wherein at least one of the guide elements is designed to encompass the planet carrier in a radial direction on both axial sides of the planet carrier.

7. The powertrain of claim 1, wherein the guide jaws are constructed of multiple parts comprising a first jaw part for guiding by impinging on an outer circumferential face of the planet carrier and a second jaw part for guiding by impinging on an axial lateral face of the planet carrier.

8. The powertrain of claim 7, wherein the guide jaws are constructed of two parts.

9. The powertrain of claim 7, wherein the first jaw part comprises a rotatably mounted guide roller.

10. The powertrain of claim 7, wherein the first jaw part forms a substantially radially extending oil channel.

11. The powertrain of claim 1, wherein at least one of the guide elements sits to be preloaded in a radial direction between the transmission housing and the planet carrier.

12. The powertrain of claim 1, wherein a connection between the bearing housing of the main bearing unit and the transmission housing, or between the main shaft of the main bearing unit and the planet carrier of the planetary stage, is embodied as a flexible connection.

13. The powertrain of claim 12, wherein the flexible connection is formed by a flange element between the bearing housing and the transmission housing, or by a flexible coupling element between the main shaft and the planetary stage.

14. A wind power installation, comprising:

a rotor flange comprising a rotor;

a generator;

a machine support; and a powertrain held on the machine support and connecting the rotor flange to the generator, said powertrain being designed as set forth in claim 3.

15. A data agglomerate, comprising data packets combined in a common file or distributed among different files for depicting a three-dimensional design and/or interactions of all constituent parts in the powertrain of claim 1, said data packets being specified so as to carry out, during processing by a data processing device, additive manufacturing of the constituent parts of the planetary transmission of the powertrain.

16. The data agglomerate of claim 15, wherein the additive manufacturing is realized by 3D printing using a 3D printer and/or a simulation of the functioning of the powertrain.

* * * * *